United States Patent
Zak et al.

(10) Patent No.: US 10,176,187 B2
(45) Date of Patent: Jan. 8, 2019

(54) METHOD AND APPARATUS FOR GENERATING A PLURALITY OF INDEXED DATA FIELDS

(71) Applicant: Huawei Technologies Co., Ltd., Shenzhen (CN)

(72) Inventors: Emil Zak, Munich (DE); Biao Liang, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 315 days.

(21) Appl. No.: 15/209,278

(22) Filed: Jul. 13, 2016

(65) Prior Publication Data
US 2016/0321289 A1 Nov. 3, 2016

Related U.S. Application Data

(63) Continuation of application No. PCT/EP2014/050431, filed on Jan. 13, 2014.

(51) Int. Cl.
*G06F 17/30* (2006.01)

(52) U.S. Cl.
CPC .... *G06F 17/30153* (2013.01); *G06F 17/3048* (2013.01); *G06F 17/30946* (2013.01); *G06F 17/30958* (2013.01); *G06F 17/30985* (2013.01)

(58) Field of Classification Search
CPC .................................................. G06G 17/30
USPC ........................................................ 707/693
See application file for complete search history.

(56) References Cited

U.S. PATENT DOCUMENTS

| | | | | |
|---|---|---|---|---|
| 8,688,655 | B2 * | 4/2014 | Fusco | G06F 17/30324 707/693 |
| 8,838,551 | B2 * | 9/2014 | Fanghaenel | G06F 17/30336 707/693 |
| 8,972,360 | B2 * | 3/2015 | Kauffman | G06F 17/30153 704/500 |
| 2008/0046423 | A1 | 2/2008 | Khan et al. | |
| 2011/0167030 | A1 | 7/2011 | Bremler-Barr et al. | |
| 2013/0188883 | A1 * | 7/2013 | Gisquet | G06T 9/004 382/233 |
| 2013/0235754 | A1 * | 9/2013 | Lim | H04W 72/042 370/252 |

(Continued)

FOREIGN PATENT DOCUMENTS

CN 101630323 A 1/2010

OTHER PUBLICATIONS

Partial English Translation and Abstract of Chinese Patent Application No. CN101630323, Jan. 20, 2010, 16 pages.

(Continued)

*Primary Examiner* — Kim T Nguyen
(74) *Attorney, Agent, or Firm* — Conley Rose, P.C.

(57) ABSTRACT

A method for generating a plurality of indexed data fields based on a pattern set comprising a plurality of patterns, the method comprising detecting for each pattern from the pattern set a pattern offset; creating for each pattern offset in the pattern set an indexed pattern group, wherein the index of the indexed pattern group corresponds to the pattern offset; adding each pattern in the pattern set having the same pattern offset to the indexed pattern group having an index corresponding to the pattern offset; adding each pattern having no specific pattern offset to each of the indexed pattern groups; and compiling each indexed pattern group into an indexed data field.

20 Claims, 11 Drawing Sheets

(56) References Cited

U.S. PATENT DOCUMENTS

| | | | |
|---|---|---|---|
| 2014/0177550 A1* | 6/2014 | Liao | H04W 28/18 370/329 |
| 2014/0379726 A1* | 12/2014 | Roger | G06F 19/22 707/741 |
| 2015/0077759 A1* | 3/2015 | Ellis | G01B 9/02007 356/482 |
| 2016/0057717 A1* | 2/2016 | Liberg | H04W 28/0205 370/350 |

OTHER PUBLICATIONS

Foreign Communication From a Counterpart Application, PCT Application No. PCT/EP2014/050431, International Search Report dated Sep. 19, 2014, 4 pp.

* cited by examiner

METHOD AND APPARATUS FOR GENERATING A PLURALITY OF INDEXED DATA FIELDS

CROSS-REFERENCE TO RELATED APPLICATION

This application is a continuation of International Application No. PCT/EP2014/050431, filed on Jan. 13, 2014, which is hereby incorporated by reference in its entirety.

TECHNICAL FIELD

The present disclosure relates to a method and an apparatus for generating a plurality of indexed data fields. The disclosure further relates to a method for high performance multi-pattern regular expression (regex) matching.

BACKGROUND

Many network security applications in today's networks are based on deep packet inspection, checking not only the header portion but also the payload portion of a packet. For example, traffic monitoring, layer-7 filtering and network intrusion detection all require an accurate analysis of packet content in search of matching a predefined data set of patterns to identify specific classes of applications, viruses, attack signatures, etc. Traditionally, the data sets were constituted of a number of signatures to be searched with string matching algorithms, but nowadays regular expressions are used due to their increased expressiveness and ability to describe a wide variety of payload signatures. Multi-pattern regex matching in which packet payloads are matched against a large set of patterns is an important algorithm in network security applications.

As the network grows, new application and new protocols increase every day, the patterns in data set change very fast and need to update into network security applications frequently. That demands for multi-pattern regex matching algorithms that can be compiled in very short time. On the other hand, as network security applications need to process packets online in real time and high-speed, the multi-pattern regex matching engine will impact the throughput and latency. This gives a big challenge to the performance and memory footprint to the multi-pattern regex matching engine.

Nowadays, most processor vendors are increasing the number of cores in a single chip. This trend is observed not only in multi-core processors but also in many-core processors. Since deep packet inspection is often a bottleneck in packet processing, exploiting parallelism in multi-core and many-core architectures is a key to improving overall performance.

The winning criteria for multi-pattern regex matching engine are performance, memory footprint, compilation time and scalability. On the other hand, only a few patterns in the data set use complex regex syntax, most of regex patterns in the data set are simple as described in the following. Strings may be presented as an exact sequence of symbols or digits as illustrated in Table 1, for example as "hello". Strings may be anchored to a certain position inside of the data set or not, for example as "^.{3}hello". Parts of the string may be presented as character sets, for example as "he[l-n]o". Strings may be case-sensitive or case-insensitive, e.g. per symbol.

TABLE 1

Example of simple regex patterns

| regex syntax | Example |
| --- | --- |
| simple string | "hello" |
| Anchor | "^.{3}hello" may correspond to "hello" with offset 3 |
| character set | "he[l-n]o" may correspond to "helo", "hemo" and "heno" |
| case (in)sensitive | "(?i)hello" |

Existing technical approaches implement regex matching by using finite automata, such as non-deterministic finite automaton (NFA), deterministic finite automaton (DFA), multiple deterministic finite automaton (mDFA), delayed input deterministic finite automaton (D2FA), hybrid finite automaton (HFA) and extended finite automaton (XFA). mDFA divides rules into different groups and compiles them into respective DFAs. D2FA compresses the edge of each state for each DFA state by using a default path. HFA compresses DFA states by using hybrid DFA and NFA. XFA compresses DFA states by adding bit or counter variables for each state. However, existing approaches, both NFA and DFA, have limitations. NFAs have excessive time complexity while DFAs have excessive space complexity and long compile times. mDFA increases the memory bandwidth since each of these DFAs must access the main memory once for each byte in the payload. D2FA has a longer compile time than DFA and cannot solve the excessive space complexity while DFA compiling. HFA cannot compress DFA states for simple regex expressions. With respect to XFA many variable read/write operations decrease the overall performance.

Another solution retrieves longest strings from each regex pattern, compiles all strings and matches the packet payload by using exact string matching algorithms such as Aho-Corasick (AC), Modified Wu-Manber (MWM), Trie, etc. After an exact string matching, a set of possible match results may be obtained and respective regex patterns may be verified for each match result one by one. The set of possible match results, however, can be large, especially for those regex patterns with short longest strings, e.g. with only 1 or 2 bytes. Respective regex expressions have to be verified which dramatically decreases the overall performance.

SUMMARY

It is the object of the disclosure to provide a technique for improved multi-pattern string matching.

This object is achieved by the features of the independent claims. Further implementation forms are apparent from the dependent claims, the description and the figures.

The disclosure as described in the following is based on the finding that multi-pattern string matching can be improved to support regex by using multi offset based multi-pattern string matching.

A multi-pattern regex matching engine using multi-offset based multi-pattern string matching can achieve high performance, small memory footprint, a short compilation time and has a good scalability in multi-core and many-core processors.

In order to describe the disclosure in detail, the following terms, abbreviations and notations will be used.

CPU: Central Processing Unit.
GPU: Graphics Processing Unit.

DFA: Deterministic Finite Automaton.
mDFA: multiple Deterministic Finite Automaton.
D2FA: Delayed Input Deterministic Finite Automaton.
HFA: Hybrid Finite Automaton.
XFA: Extended Finite Automaton.
Regex: regular expression.
Trie: an ordered tree data structure.
DPI: Deep Packet Inspection.
IPS: Intrusion Prevention System.
IDS: Intrusion Detection System.
AV: Anti-Virus.
DLP: Data Loss Prevention.
URL: Uniform Resource Locator.
SIMD: Single Instruction Multiple Data.

A DFA—also known as deterministic finite state machine—is a finite state machine that accepts/rejects finite strings of symbols and produces a unique computation (or run) of the automaton for each input string. 'Deterministic' refers to the uniqueness of the computation.

A regular expression (abbreviated regex) is a sequence of characters that forms a search pattern, mainly for use in pattern matching with strings, or string matching, i.e. "find and replace"-like operations.

A Trie, also called digital tree, radix tree or prefix tree as they can be searched by prefixes, is an ordered tree data structure that is used to store a dynamic set or associative array where the keys are usually strings. Unlike a binary search tree, no node in the tree stores the key associated with that node; instead, its position in the tree defines the key with which it is associated. All the descendants of a node have a common prefix of the string associated with that node, and the root is associated with the empty string.

SIMD is a class of parallel computers in a classification of computer architectures. It describes computers with multiple processing elements that perform the same operation on multiple data points simultaneously. Thus, such machines exploit data level parallelism, for example, array processors or GPUs.

According to a first aspect, the disclosure relates to a method for generating a plurality of indexed data fields based on a pattern set comprising a plurality of patterns, the method comprising detecting for each pattern from the pattern set a pattern offset; creating for each pattern offset in the pattern set an indexed pattern group, wherein the index of the indexed pattern group corresponds to the pattern offset; adding each pattern in the pattern set having the same pattern offset to the indexed pattern group having an index corresponding to the pattern offset; adding each pattern having no specific pattern offset to each of the indexed pattern groups; and compiling each indexed pattern group into an indexed data field.

By applying offset based many-offset multi-pattern string matching, a multi-pattern string matching algorithm can be used that supports simple regex syntax. The multi-pattern string matching algorithm is used to achieve short compilation time. By memory compacting, memory footprint is small. By cache efficient two byte head node optimization, a high performance can be obtained.

In a first possible implementation form of the method according to the first aspect, the patterns from the pattern set comprise REGEX regular expressions (e.g. according to the Institute of Electrical and Electronic Engineers (IEEE) POSIX 1003.2 specification).

Such regular expressions are standardized; the method can thus be flexibly used on multiple hardware and software platforms.

In a second possible implementation form of the method according to the first aspect as such or according to the first implementation form of the first aspect, at least one of the patterns in the pattern set is from one of the following types: simple string type, anchor type, character set type, case sensitive type and case insensitive type.

The method thus implements all typical pattern types and additionally provides the possibility of implementing also patterns form the anchor type into a multi-pattern string matching technology.

In a third possible implementation form of the method according to the second implementation form of the first aspect, the anchor type indicates a specific pattern offset.

By indicating a specific pattern offset, the anchor type pattern is added to a pattern group according to its specific pattern offset.

In a fourth possible implementation form of the method according to the first aspect as such or according to any of the preceding implementation forms of the first aspect, each data field is based on a Trie.

In a Trie, a node's position in the Trie defines the key with which it is associated. All the descendants of a node have a common prefix of the string associated with that node, and the root is associated with the empty string. Therefore, a Trie can easily be searched.

In a fifth possible implementation form of the method according to the fourth implementation form of the first aspect, a Trie which is based on a particular indexed data field comprises nodes which elements correspond to characters included in the patterns which are compiled into the particular indexed data field, each node comprising at least one character.

Elements corresponding to characters included in the patterns mapped to the particular data field can be easily retrieved. A computational complexity for forming the Trie and retrieving data from the Trie is low.

In a sixth possible implementation form of the method according to the fifth implementation form of the first aspect, the method comprises compacting nodes of the Trie having only a predetermined number of next node pointers into one compact node.

Compacting nodes saves computational resources. By memory compacting, memory footprint is small.

In a seventh possible implementation form of the method according to the sixth implementation form of the first aspect, the method comprises compacting a plurality of nodes of the Trie into one compact node comprising a node type, wherein the node type indicates a number of next node pointers of the nodes compacted to the compact node.

When compacting the nodes computational resources can be saved. By using the node types retrieving data from the Trie can easily be performed.

In an eighth possible implementation form of the method according to the sixth or the seventh implementation form of the first aspect, the method comprises compacting uniquely following nodes in at least one of a middle section and a tail section of the Trie to one compact node.

Uniquely following nodes in the middle section or in the tail section can be compacted thereby saving space and computational resources. Uniquely following nodes can be exactly reconstructed.

In a ninth possible implementation form of the method according to any one of the sixth to the eighth implementation forms of the first aspect, the compacting uses text matching with respect to elements of the nodes being compacted.

Text matching is an easy and fast method for compacting the nodes.

In a tenth possible implementation form of the method according to any one of the fourth to the ninth implementation forms of the first aspect, the method comprises merging nodes of a first layer of the Trie with nodes of a second layer of the Trie into one two-byte head node.

Merging the nodes into one two-byte node improves the performance of a pattern matching process as the number of false-positives on the first two bytes will be less compared to the number of false positives on one byte and as result, the number of memory accesses is decreased. Hence, by the cache efficient two byte head node optimization, a high performance can be obtained.

In an eleventh possible implementation form of the method according to the first aspect as such or according to any of the preceding implementation forms of the first aspect, the method further comprises compiling each pattern having no specific pattern offset further into a data field having no specific index.

By compiling each pattern having no specific offset (such as floating patterns with an anchor value of −1) not only into indexed data fields which correspond to certain pattern offsets, but also in a data field having no specific index, it can be achieved that also an efficient search of floating patterns is enabled. Especially when compared to a solution in which for each possible offset an own indexed data field would be generated into which such floating patterns would be compiled, a more memory efficient solution is achieved by compiling such floating patterns into data fields having no specific index associated with.

In a twelfth possible implementation form of the method according to the first aspect as such or according to any of the preceding implementation forms of the first aspect, at least one of the patterns in the pattern set has at least two different pattern offsets associated with. This pattern is added to at least two different indexed pattern groups, wherein the indexes of such indexed pattern groups correspond to the pattern offsets of the pattern.

By having the possibility of handling more than one pattern offset per pattern, a large variety of Anchors in regex expressions can be handled. Especially the use of anchor ranges or pattern offset ranges is in regex expressions is enabled.

According to a second aspect, the disclosure relates to a method for finding patterns in a data packet, wherein the patterns to be found have a specific offset and are compiled into an indexed data field, the index of the data fields corresponds to the specific offset of the patterns, the method comprising matching elements of the patterns in the indexed data field onto elements of the data packet, wherein a first element of the data packet to be matched is indicated by the index of the indexed data field; and reporting a match if a pattern in the data packet matches a pattern in the indexed data field.

By applying offset based many-offset multi-pattern string matching, a multi-pattern string matching algorithm can be used that supports simple regex syntax. The multi-pattern string matching algorithm is used to achieve short compilation time. The searching of a pattern in the pattern set is very fast.

In a first possible implementation form of the method according to the second aspect, the method is used for performing a Deep Packet Inspection, an Intrusion Prevention, Data Loss Prevention, URL Filtering or antivirus search.

The method may be flexibly implemented in one of said applications. Such method provides short compilation times, small memory footprint and high performance.

According to a third aspect, the disclosure relates to an apparatus for generating a plurality of indexed data fields based on a pattern set comprising a plurality of patterns, the apparatus comprising a detection unit configured to detect for each pattern from the pattern set a pattern offset; a creation unit configured to create for each pattern offset in the pattern set an indexed pattern group, wherein the index of the indexed pattern group corresponds to the pattern offset; a first adding unit configured to add each pattern in the pattern set having the same pattern offset to the indexed pattern group having an index corresponding to the pattern offset; a second adding unit configured to add each pattern having no specific pattern offset to each of the indexed pattern groups; and a compiling unit configured to compile each indexed pattern group into an indexed data field.

Such apparatus supports simple regex syntax. By using a data structure comprising a plurality of indexed data fields, even anchor data types can be mapped to the data structure. A variety of regex expressions can thus be mapped to the data structure. The apparatus provides short compilation times at small memory footprint and high performance data retrieval.

According to a fourth aspect, the disclosure relates to a computer program with a program code for performing a method according to the first aspect as such or according to any of the preceding implementation forms of the first aspect or according to the second aspect as such or according to the first implementation form of the second aspect, when the computer program runs on a computer.

The computer program can be flexibly designed such that an update of the requirements is easy to achieve. The computer program product may run on an apparatus for mapping a pattern set to a data structure as described above.

BRIEF DESCRIPTION OF THE DRAWINGS

Further embodiments of the disclosure will be described with respect to the following figures, in which.

DETAILED DESCRIPTION

In the following detailed description, reference is made to the accompanying drawings, which form a part thereof, and in which is shown by way of illustration specific aspects in which the disclosure may be practiced. It is understood that other aspects may be utilized and structural or logical changes may be made without departing from the scope of the present disclosure. The following detailed description, therefore, is not to be taken in a limiting sense, and the scope of the present disclosure is defined by the appended claims.

The devices and methods described herein may be based on event computing nodes and event state stores. It is understood that comments made in connection with a described method may also hold true for a corresponding device or system configured to perform the method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless noted otherwise.

The methods and devices described herein may be implemented in multi-core and many-core processor systems and data base management systems (DBMS). The described devices and systems may include integrated circuits and/or passives and may be manufactured according to various technologies. For example, the circuits may be designed as logic integrated circuits, analog integrated circuits, mixed signal integrated circuits, optical circuits, memory circuits and/or integrated passives.

Figure 1:
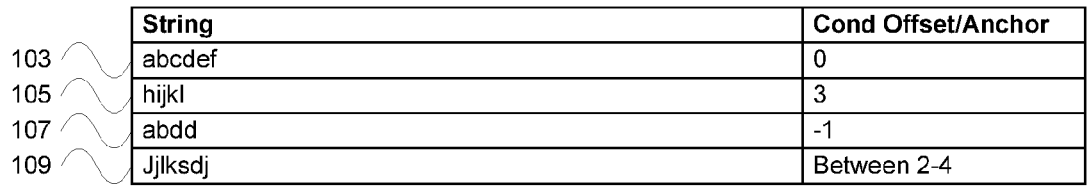
FIG. 1 shows a schematic diagram illustrating how patterns having different offsets are added to different indexed pattern groups to support anchored syntax according to an implementation form.
Figure 1:
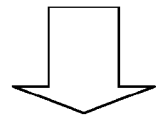
Figure 1:
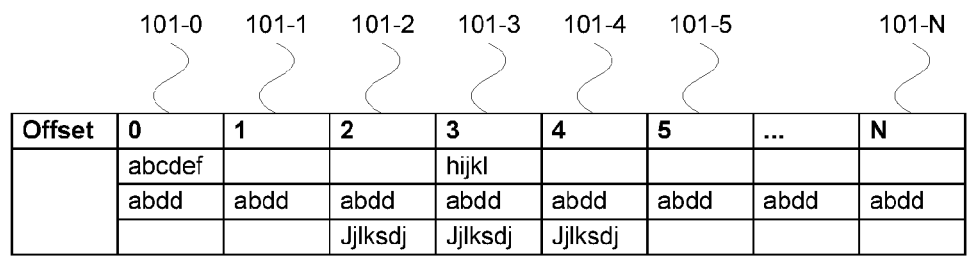
Figure 3:
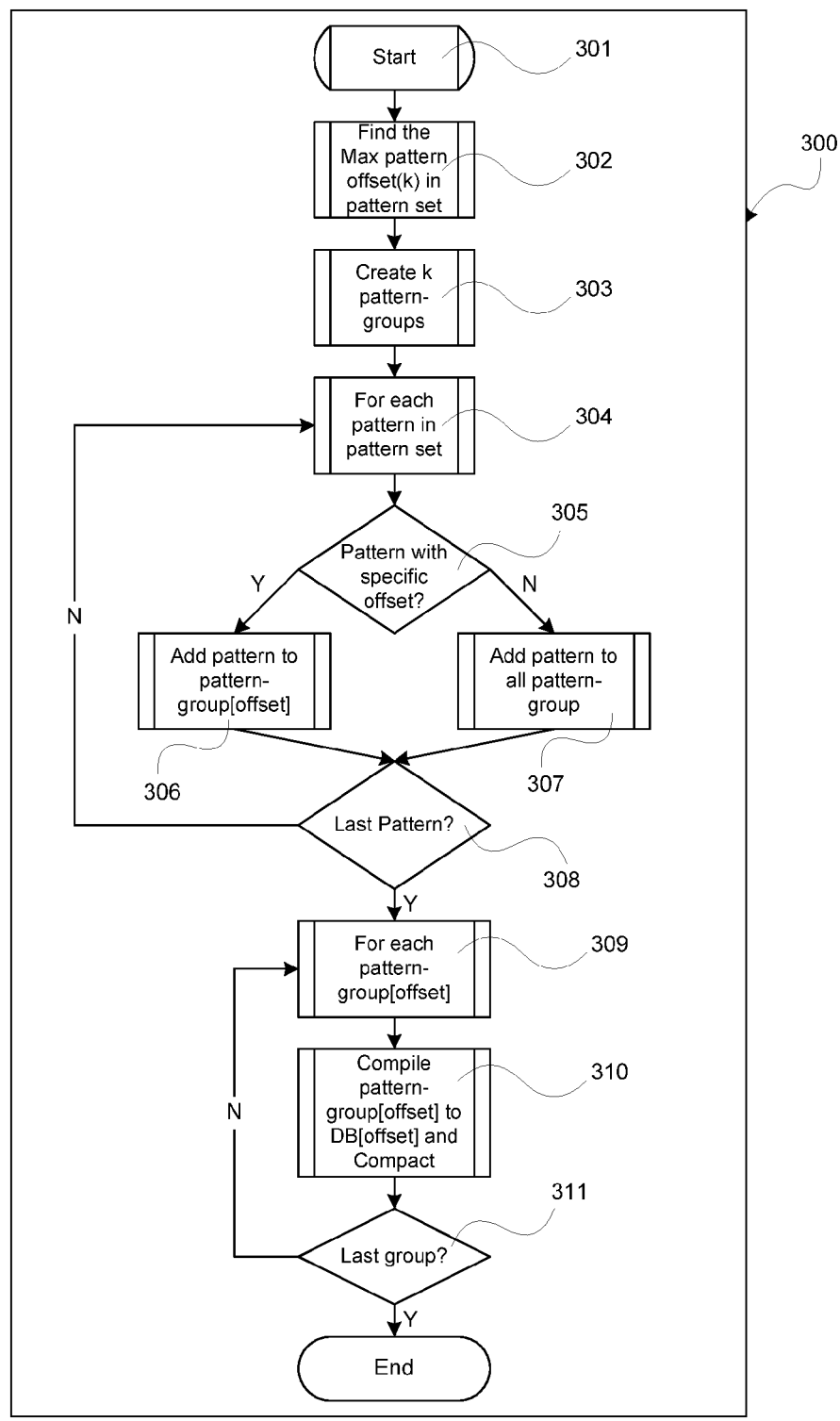
FIG. 3 shows a flow diagram of a method for generating a plurality of indexed data fields based on a pattern set comprising a plurality of patterns according to an implementation form.

FIG. 1 shows a schematic diagram illustrating a compile preprocess of a many-offset string matching method to support anchored syntax according to an implementation form. In the example illustrated in FIG. 1 it is shown how patterns having different offsets are added to different indexed pattern groups to support anchored syntax according to an implementation form (e.g. the method as shown in FIG. 3).

In the example shown in the following, the different generated indexed data fields each comprise a Trie used for performing the multi-pattern string matching. However, other types of indexed data fields may be also used for representing the patterns.

The compile preprocess illustrated exemplarily in FIG. 1 is based on the following steps. For each pattern offset in a pattern set an indexed pattern group or table is generated. The index of each pattern group corresponds to the pattern offset for which the pattern group or table was generated. Based on the string offset or pattern offset, floating strings or patterns (having no offset associated with) are added into all the or indexed pattern groups tables while anchored string or patterns (having a specific offset associated with) are added to tables or indexed pattern group having an index corresponding to the pattern offset of the pattern.

In the example in FIG. 1 an exemplary pattern set 100 includes a first string or pattern 103 "abcdef" with conditional offset (or pattern offset) or anchor of 0, a second string or pattern 105 "hijkl" with conditional offset (or pattern offset) or anchor of 3, a third string or pattern 107 "abdd" with conditional offset (or pattern offset) or anchor of −1 and, a fourth string or pattern 109 "Jjlksdj with conditional offset (or pattern offset) or anchor between 2 and 4. The pattern offset may define a first byte of a packet at which the pattern has to be searched in the packet. The pattern offset of −1 means that the third pattern 107 has no specific offset i.e. is a floating pattern. Therefore, the pattern matching method has to search a complete packet for such third pattern 107.

The pattern set 100 is mapped to a plurality of indexed pattern groups 101-0 to 101-N. In detail each pattern 103 to 109 from the pattern set is added to at least one indexed pattern group an index of which corresponds 101-0 to 101-N to the pattern offset of the pattern 103 to 109. As an example, the first pattern 103 "abcdef" having the pattern offset of 0 is added to a zeroth indexed pattern group 101-0 having the index 0. Furthermore, the fourth pattern 109 "Jjlksdj" having a pattern offset between 2 and 4 is added to a second indexed pattern group 101-2 having the index 2, a third indexed pattern group 101-3 having the index 3 and a fourth indexed pattern group 101-4 having the index 4. The second pattern 105 "hijkl" having a pattern offset 3 is added only to the third indexed pattern group 101-3 having the index 3.

The third pattern 107 "abdd" having no specific pattern offset associated with is added to all indexed pattern groups 101-0 to 101-N. Hence, at least if the pattern set 100 comprises a pattern having no specific offset, for each possible offset in the pattern set 100 an own indexed pattern group can be created and such pattern having no specific offset can be added to all of the generated indexed pattern groups.

Offset 0 (zero) or any other positive offset means the actual anchor of the pattern. For example, "abed" with offset 0 may be presented as regex: "^abcd". The same string "abed" with offset 3 may be presented as "^.{3}abcd". Offset −1 (minus one) means that the string is floating, or may be presented as ".*abcd" regex with no anchor (or no specific pattern offset).

Figure 2:
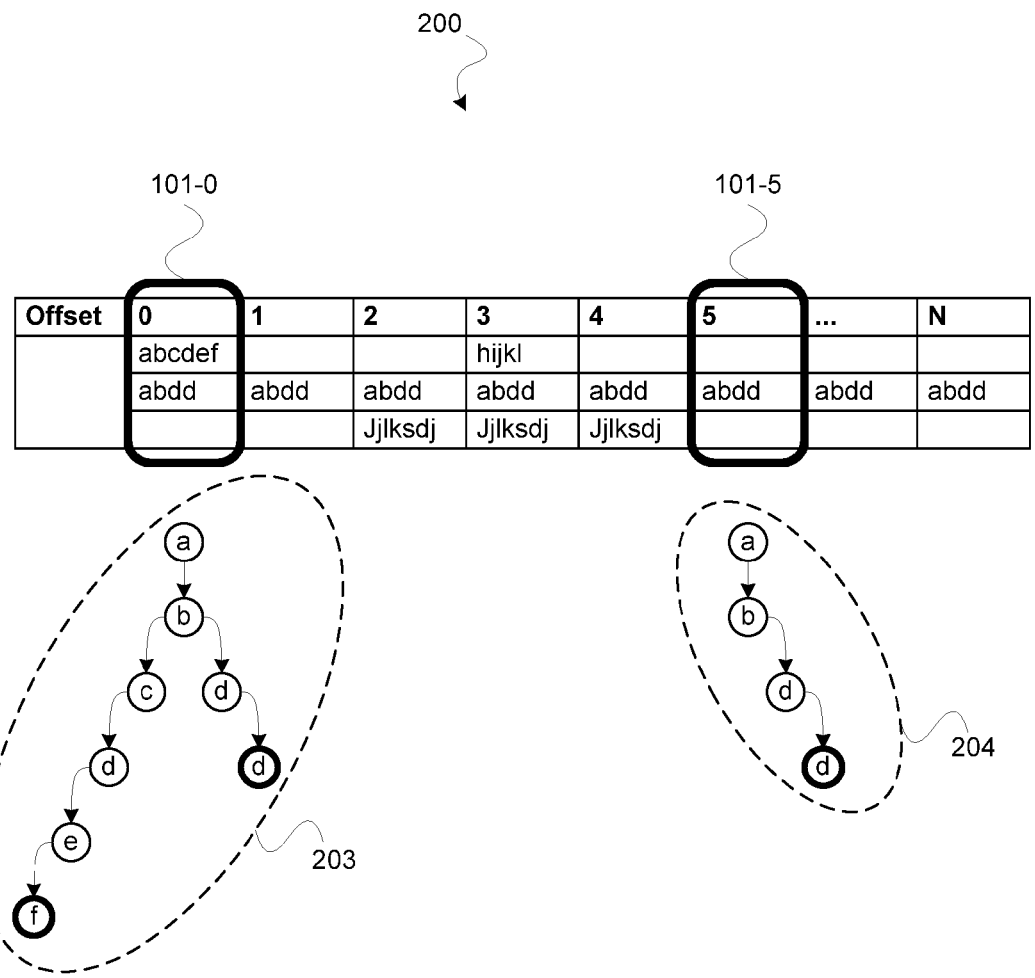
FIG. 2 shows an example how in a compilation stage according to an implementation form two different indexed pattern groups from FIG. 1 are compiled into two different indexed data fields.

FIG. 2 shows an example how in a compilation stage according to an implementation form two different indexed pattern groups from FIG. 1 are compiled into two different indexed data fields. Hence in the compilation stage each indexed pattern group is compiled into an indexed data field.

Each indexed data field represents or includes all patterns from the pattern set having a pattern offset corresponding to the index of the data field or having no specific offset. Therefore, patterns in the pattern set which have no specific offset are added into all pattern groups and are represented or included in each compiled indexed data field.

In the example shown in FIG. 2 it is illustrated how the zeroth indexed pattern group 101-0 is compiled in to a first indexed data field 203 having the index 0 and the fifth indexed pattern group 101-5 is compiled in to a second indexed data field 204 having the index 5. Hence, all patterns in the zeroth indexed pattern group 101-0 are compiled into the first indexed data structure (in the example into a first Trie) 203. The first Trie 203 has a base node "a" pointing to one successor node "b" pointing to two successor nodes "c" and "d". Node "c" points to another successor node "d" which points to a successor node "e" which points to a successor node "f". Node "d" points to another successor node "d".

Furthermore, all patterns in the fifth indexed pattern group 101-5 are compiled into a second indexed data structure (in the example into a second Trie 204). The second Trie 204 has a base node "a" pointing to one successor node "b" pointing to one successor node "d" pointing to another successor node "d".

To summarize, during the compilation each indexed pattern groups 101-0 to 101-N is complied into an indexed data field 203, 204 having the same index as the corresponding indexed pattern group. The index corresponds to the pattern offset of the patterns in the indexed pattern groups.

FIG. 3 shows a flow diagram of a method 300 for generating a plurality of indexed data fields based on a pattern set comprising a plurality of patterns. The compiling of the pattern set into the indexed data fields described in conjunction with FIG. 1 and FIG. 2 was performed using the method 300.

After start 301, an instruction 302 to find the maximum pattern offset(k) in a pattern set is performed. In other word, in step 302 for each the pattern in the pattern set a pattern offset is detected. Then, an instruction 303 to create k indexed pattern groups is performed. Hence, for each detected pattern offset in the pattern set an indexed pattern group is created, wherein the index of the pattern group corresponds to the pattern offset. According to a further implementation form for each possible offset in the pattern set an pattern group is created.

In a loop 304 each pattern in the pattern set it is checked in a step 305 if the pattern has a specific pattern offset. If a pattern has a specific pattern offset (e.g. an having anchor value ≥0) this pattern is added in step 306 to an indexed pattern group[offset] having an index corresponding to the pattern offset of the pattern. Hence, each pattern in the pattern set having the same pattern offset is added to the pattern group having an index corresponding to such same pattern offset. If a pattern has no specific pattern offset (e.g. having an anchor value=−1) the pattern is added 307 to all created indexed pattern groups. Hence, each pattern having no specific pattern offset is added to all pattern groups.

Furthermore, for the floating patterns a further data field can be generated which has no specific offset. Each floating pattern (which has no specific pattern offset) is then further compiled into such data field having no specific index.

By compiling each pattern having no specific offset (such as floating patterns with an anchor value of −1) not only into indexed data fields which correspond to certain pattern offsets, but also in a data field having no specific index, it can be achieved that also an efficient search of floating patterns is enabled. Especially when compared to a solution in which for each possible offset an own indexed data field would be generated into which such floating patterns would be compiled, a more memory efficient solution is achieved by compiling such floating patterns into data fields having no specific index associated with.

Furthermore, patterns having more than one specific pattern offset (e.g. having an anchor value x≤anchor≥y, wherein x>0, and x, y are natural numbers), are for each of their pattern offsets added to an indexed pattern group having an index corresponding the pattern offset.

In other words, pattern having at least two different pattern offsets associated with are added to at least two different indexed pattern groups, wherein the indexes of such indexed pattern groups correspond to the pattern offsets of the patterns.

By having the possibility of handling more than one pattern offset per pattern, a large variety of Anchors in regex expressions can be handled. Especially the use of anchor ranges or pattern offset ranges is in regex expressions is enabled.

This process of adding the patterns to indexed pattern groups is performed until all patterns have been added to at least one indexed pattern group (308).

In a loop 309 for each pattern group[offset], an instruction 310 to compile the indexed pattern groups (patterngroup [offset]) to indexed data fields (DB[offset]) is performed. Optionally each indexed data fields can be further compacted. This process of compiling and compacting is performed until the last indexed pattern group was compiled into an indexed data field (311).

In other words, in the steps 309, 310, 311 each indexed pattern group is compiled into an indexed data field. The index of each data field corresponds to the pattern offset of the patterns compiled into the indexed data field. Hence, for each pattern offset detected in the pattern set an own indexed data field is generated.

The flow diagram 300 thus illustrates a method for generating a plurality of indexed data fields 203, 204, e.g. as described above with respect to FIG. 2 based on a pattern set comprising a plurality of patterns. The method may correspond to the method 1000 described below with respect to FIG. 10. In particular, the detecting for each pattern from the pattern set a pattern offset may be performed in step 302. The creating for each pattern offset in the pattern set an indexed pattern group, e.g. an indexed pattern group 101-0, 101-5 as described above with respect to FIG. 2, wherein the index of the indexed pattern group corresponds to the pattern offset may be performed in step 303. The adding each pattern in the pattern set having the same pattern offset to the indexed pattern group having an index corresponding to the pattern offset may be performed in step 306. The adding each pattern having no specific pattern offset to each of the indexed pattern groups may be performed in step 307. The compiling each indexed pattern group into an indexed data field may be performed in step 310.

After compilation of the indexed data field, a search stage of a many-offset string matching method according to an implementation form may perform the following instructions. Traverse the indexed data fields based on the pattern offset (e.g. in form of a byte offset of the data). In case of first match stop after first hit; and in case of multi match continue until end of data. The search stage may be implemented by the following program code.

```
For (int i=0; i<data_size; i++)
{
    i. db = get_db(i);
    ii. db_walk (db, &data, size-i, &results_array);
    iii. if (first_match && result_valid)
        a) break;
}
```

Figure 11:
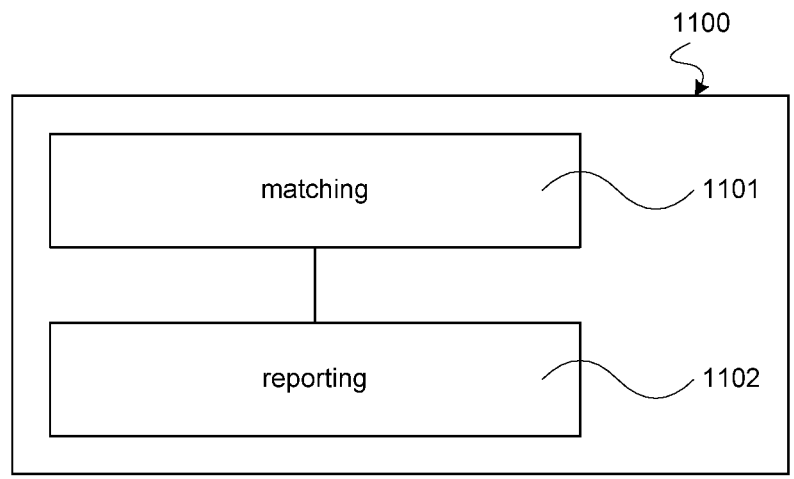
FIG. 11 shows a schematic diagram illustrating a method for finding patterns in a data packet according to an implementation form.

In other words, the program code above is a possible implementation for a method for finding patterns in a data packet according to an implementation form (as it is shown in a flow diagram in FIG. 11). The patterns to be found have a specific offset and are compiled into an indexed data field (such as the data fields 203, 204). The index of the data fields corresponds to the specific offset of the patterns.

The method comprises a step of matching elements of the patterns in the indexed data field onto elements of the data packet (db_walk), wherein a first element of the data packet to be matched is indicated by the index of the indexed data field.

Furthermore the method comprises a step of reporting a match if a pattern in the data packet matches a pattern in the indexed data field (if (first_match && result_valid) break;).

Figure 4:
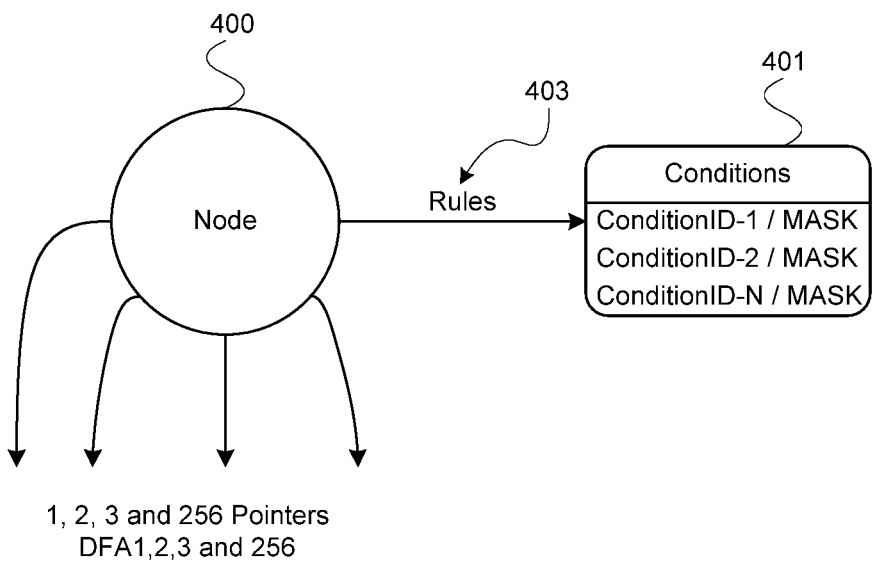
FIG. 4 shows a schematic diagram of an example for compacting a small node in a Trie in a method according to an implementation form.
Figure 4:
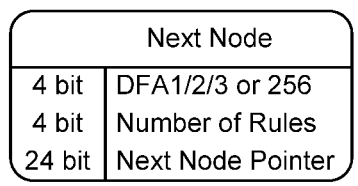

FIG. 4 shows an example for a node 400 in an indexed data field or Trie according to an implementation form which can be compacted. Compacting a node means in this disclosure reducing a size of the node or synonymously packing or compressing the node. The compacting can be performed in the above mentioned step 310 of the method 300 when the indexed data fields are generated. In the following the compacting will described using Trie structures, however, the process of compaction is applicable to other structures of the indexed data fields too.

The Trie node 400 may be compacted or packed or compressed into several type of nodes such as DFA1, DFA2, DFA3, ..., DFA256. Nodes having only 1 next node pointer 402 can be compacted to the type DFA1. Nodes having only 2 next node pointers can be compacted to the type DFA2. Nodes having only 3 next node pointers can be compacted to the type DFA3. Nodes having greater than N next node pointer can be compacted to the type DFA256. N can be 8 or other values. Rules 403 of the node 400 indicate conditions 401.

Figure 5:
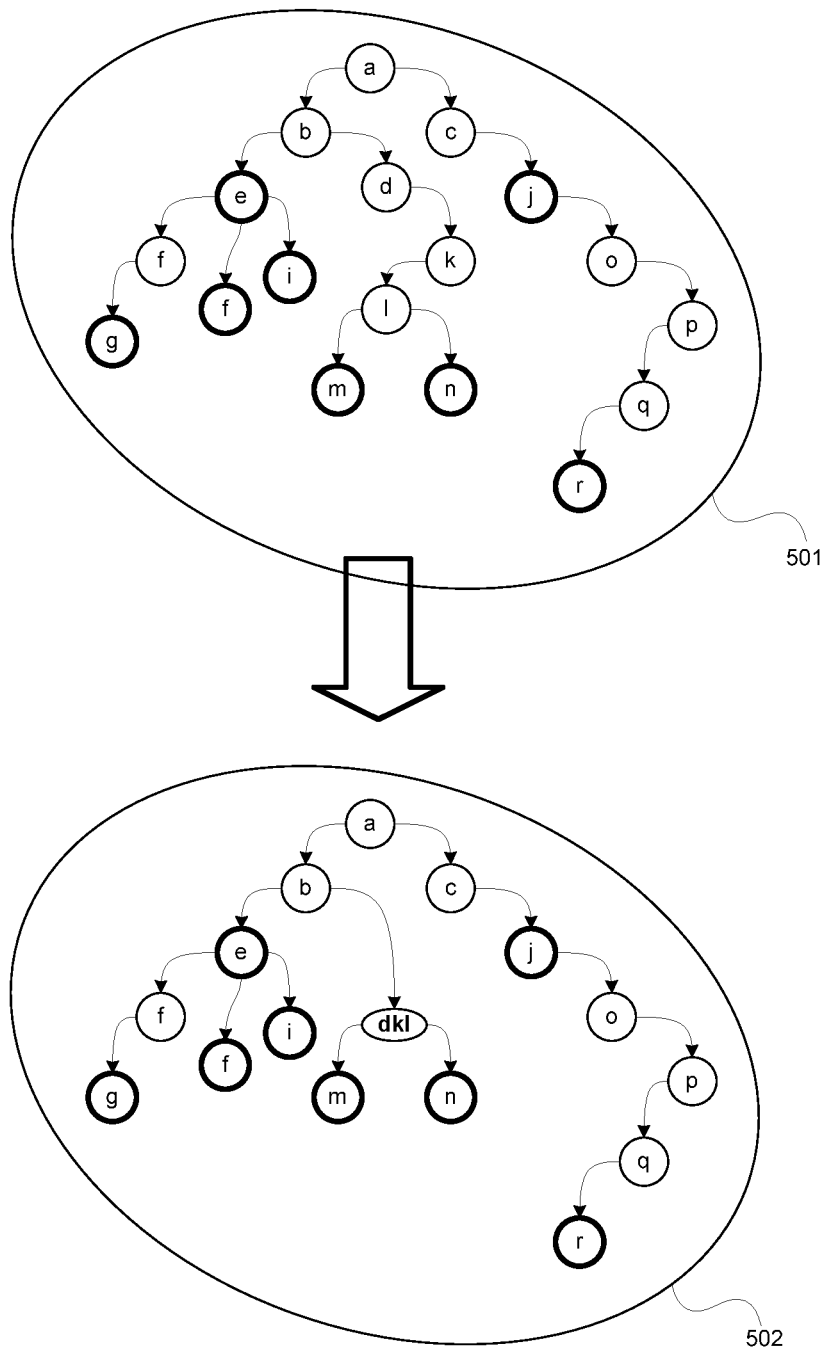
FIG. 5 shows a schematic diagram of compacting a mid-bucket node in a Trie in a method according to an implementation form.

FIG. 5 shows a schematic diagram of compacting a mid-bucket node in a Trie 501 according to an implementation form.

The compacting the mid bucket node may include compacting the uniquely following nodes in the middle of the Trie; and searching by using single instruction, multiple data (SIMD) string compare optimization. The compacting process provides a compacted or packed or compressed Trie 502 in which the uniquely following nodes d, k, l of Trie 501 are compacted into one node dkl.

Figure 6:
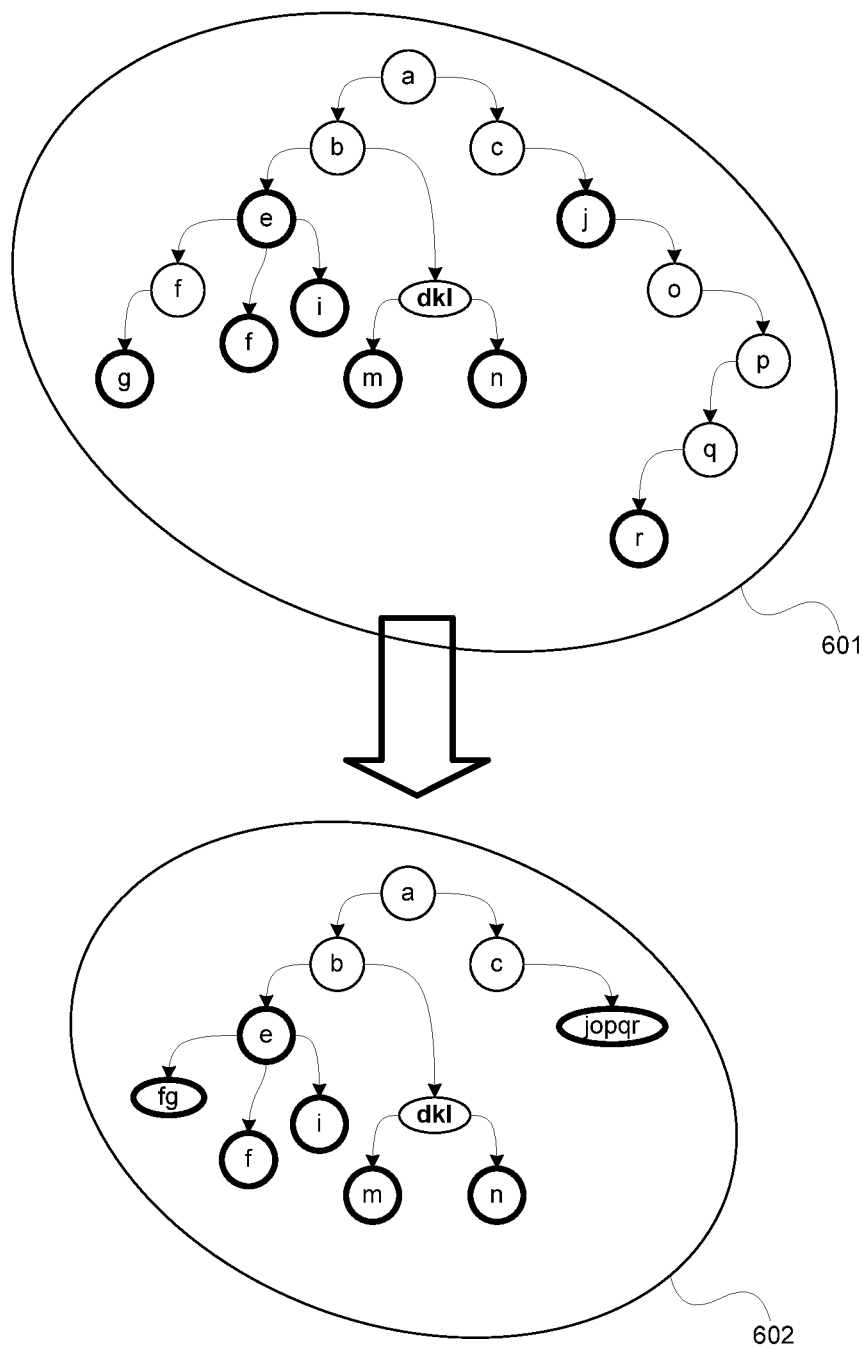
FIG. 6 shows a schematic diagram of compacting a tail-bucket node in a Trie in a method according to an implementation form.

FIG. 6 shows a schematic diagram of compacting a tail-bucket node in a Trie 601 in a according to an implementation form.

The compacting the tail bucket node may include compacting the uniquely following nodes in the tail of the Trie 601; and searching by using SIMD string compare optimization. The compacting process provides a compacted or packed or compressed Trie 602 in which the tail bucket nodes j, o, p, q, r of Trie 601 are compacted into one node jopqr.

Figure 7:
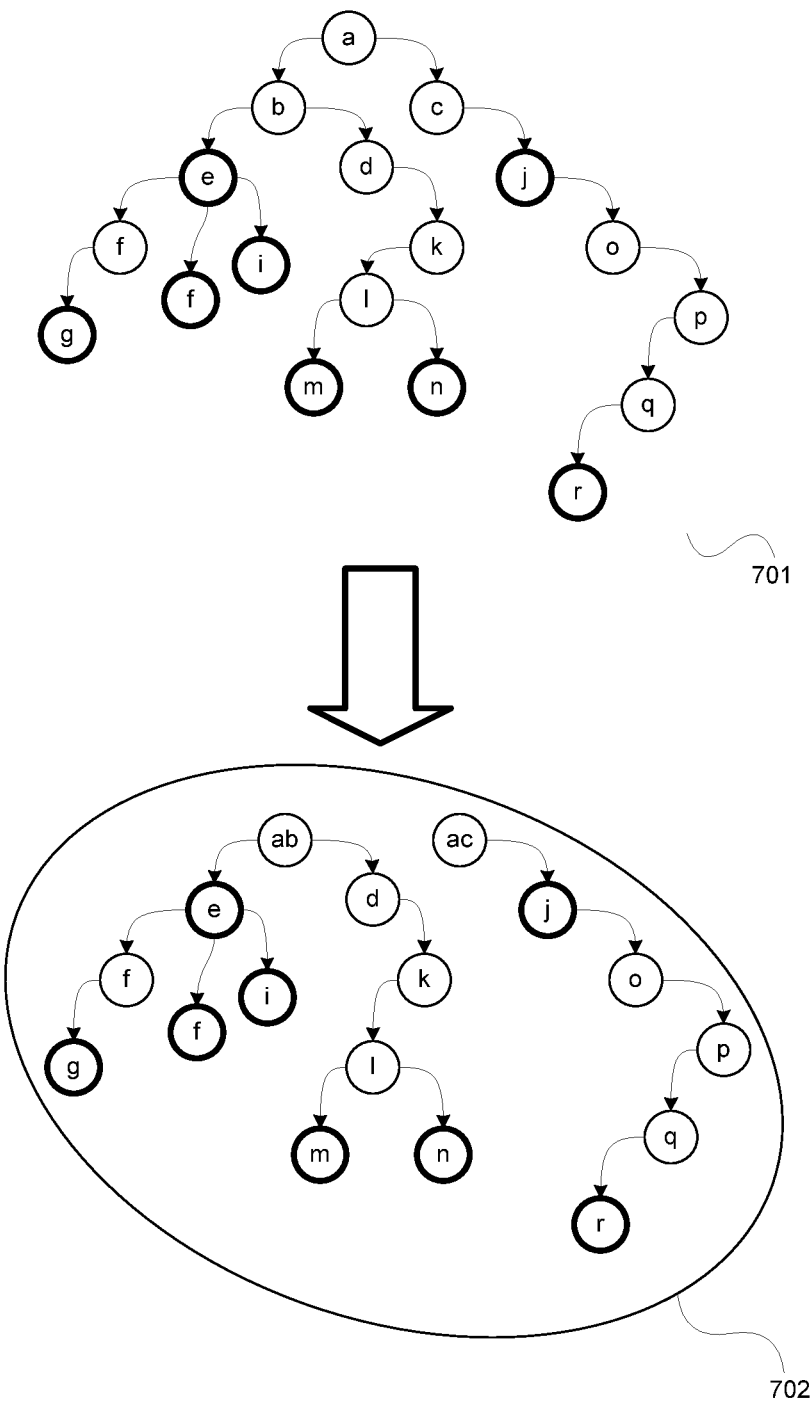
FIG. 7 shows a schematic diagram of compacting a two-byte head node in a Trie in a method according to an implementation form.

FIG. 7 shows a schematic diagram of compacting a two-byte head node in a Trie 701 according to an implementation form.

While searching in the Trie, most cases only visit the first two layer nodes, so layer 1 nodes "a" and layer 2 nodes "b" and "c" may be merged into one two-byte head node "ab" and "ac". The two-byte head node may act as a two bytes pre-filtering. By that cache HIT rate may be increased. The compacting process may provide a Trie or an indexed data field 702 with a two byte head node.

Figure 8:
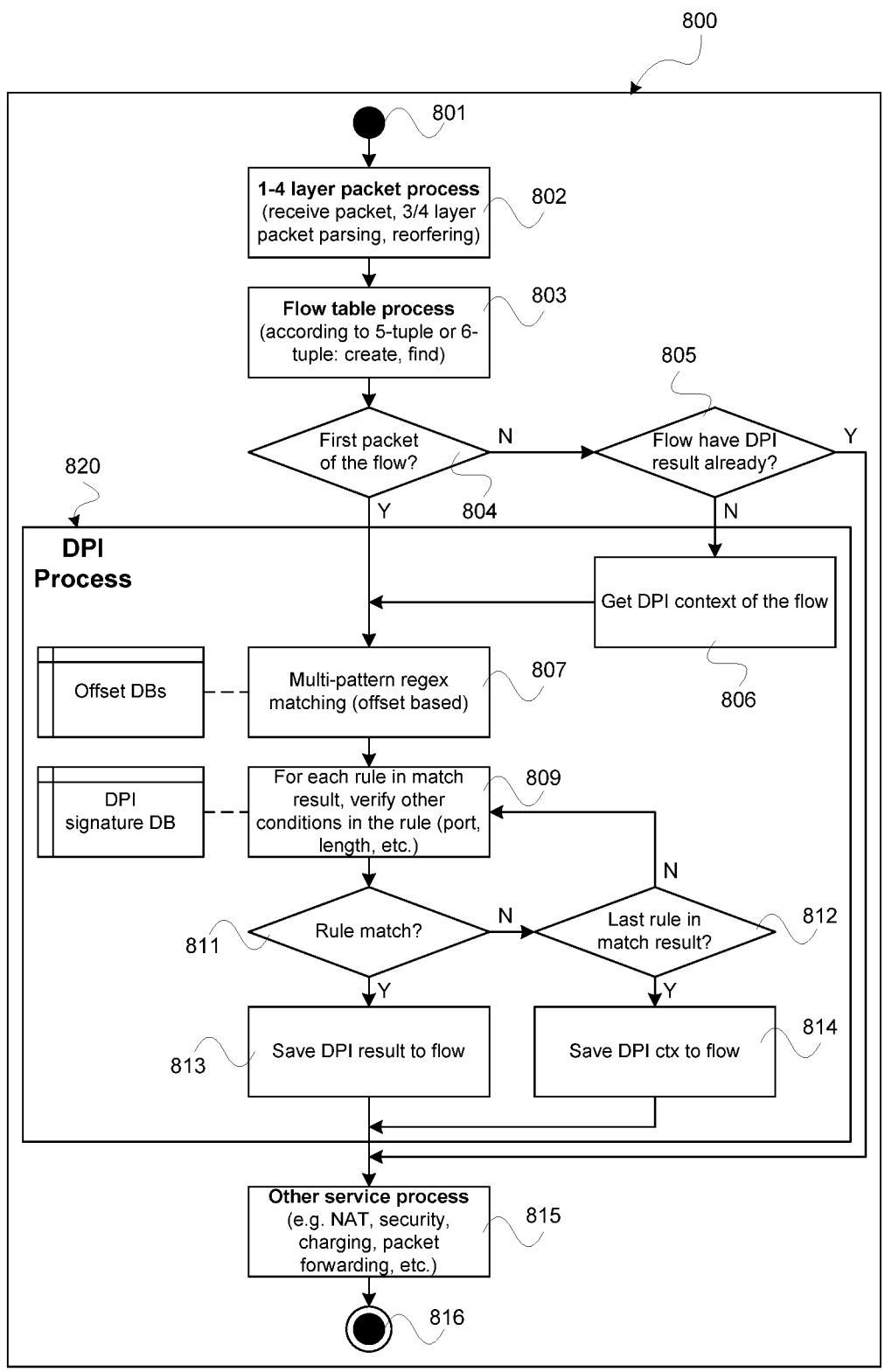
FIG. 8 shows a flow diagram of a deep packet inspection (DPI) method using the multi-pattern regex matching method according to an implementation form.

FIG. 8 shows a flow diagram of a deep packet inspection (DPI) system 800 using the multi-pattern regex matching method according to an implementation form.

After start 801, on layers 1 to 4 packet processing is performed in step 802 including receiving the packet, packet parsing and packet reordering on layers 3 and 4. Then the flow table process is performed in step 803 according to 5-tuple and 6-tuple including creating and finding. If the first packet of the flow is received in step 804, DPI process starts in step 820. Otherwise, it is checked if the flow has already a DPI result in step 805. If DPI result is not available, DPI context is obtained from the flow in step 806 and DPI process starts in step 820. If DPI result is available, other service is processed in step 815 as described below.

The DPI process in step 820 starts with multi-pattern regex matching (offset based) in step 807 that is performed based on the indexed data fields (offset DBs) created using a method for creating indexed data fields according to an implementation form (e.g. the method 300 or 1000).

For each rule in match result, other conditions in the rule are verified in step 809, such as port, length, etc., based on DPI signature DB. Upon a rule match in step 811 the DPI result is saved to flow in step 813. If the rule does not match, the match result is checked on last rule in step 812. If match result indicates last rule, the DPI ctx is saved to flow in step 814, otherwise instruction 809, i.e. verifying other conditions in the rule, is repeated. After DPI ctx or DPI result is saved, other service process is performed in step 815, e.g. NAT (network address translation), security, charging, packet forwarding etc. until the packet processing is finished in step 816.

The Multi-pattern regex matching (offset based) of step 807 based on the indexed data fields may be performed as will be described with respect to FIG. 11 and according to the source code of the search stage described earlier.

Figure 9:
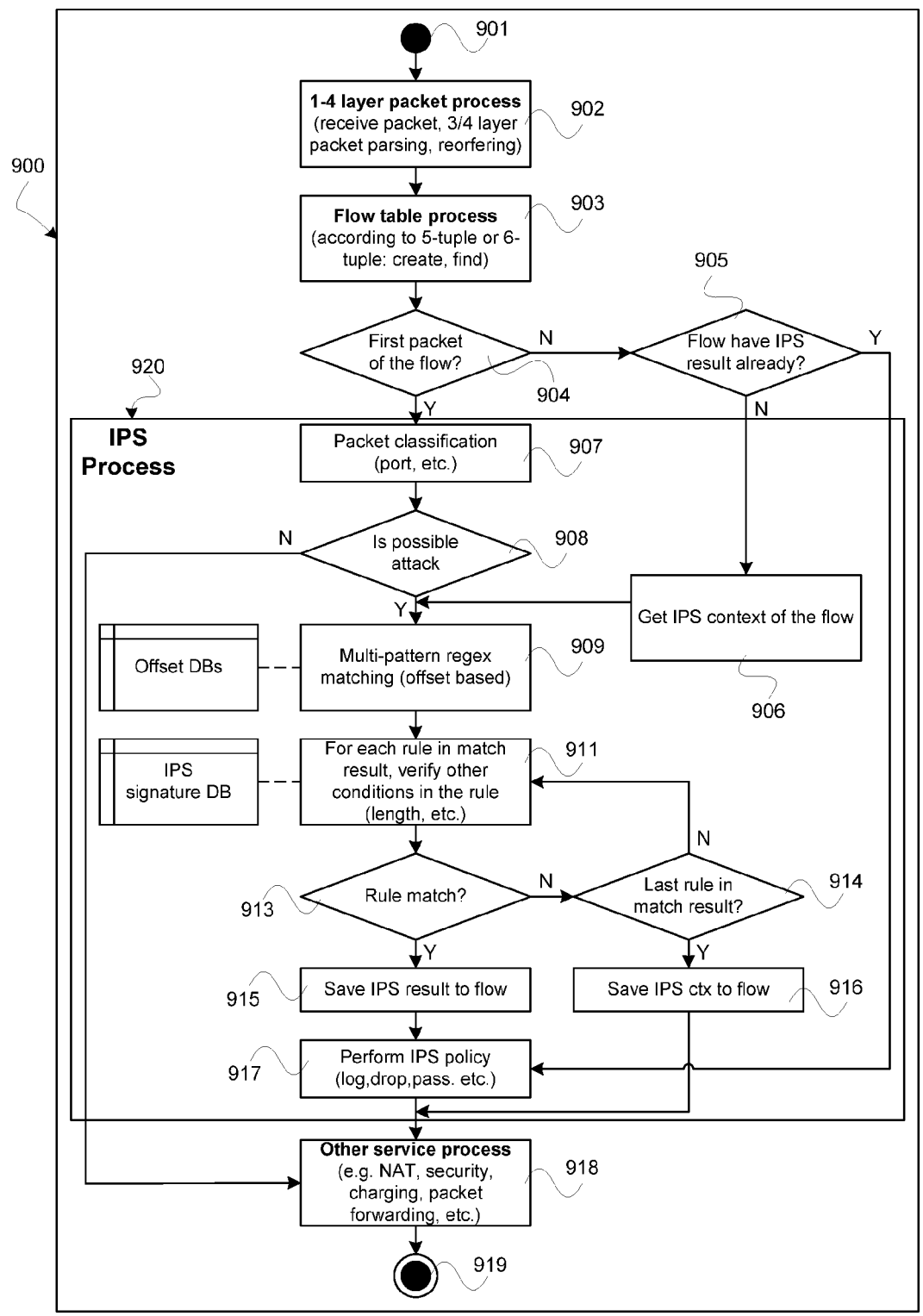
FIG. 9 shows a flow diagram of an intrusion prevention system (IPS) using the multi-pattern regex matching method according to an implementation form.

FIG. 9 shows a flow diagram of an intrusion prevention system (IPS) 900 using the multi-pattern regex matching according to an implementation form.

After start 901, on layers 1 to 4 packet processing is performed in step 902 including receiving the packet, packet parsing and packet reordering on layers 3 and 4. Then the flow table process is performed in step 903 according to 5-tuple and 6-tuple including creating and finding. If the first packet of the flow is received in step 904, IPS process starts in step 920. Otherwise, it is checked in step 905 if the flow has already an IPS result. If IPS result is not available, IPS context is obtained from the flow in step 906 and multi-pattern regex matching is performed in step 909 as described below.

The multi-pattern regex matching (offset based) in step 909 is performed based on the indexed data fields (offset DBs) created using a method for creating indexed data fields according to an implementation form (e.g. the method 300 or 1000).

If IPS result is available, IPS policy may be performed in step 917, e.g. log, drop, pass, etc. and other service may be processed in step 918 as described below. The IPS process starts in step 920 with packet classification in step 907 based on port and other parameters. If an attack is possible (step 908), multi-pattern regex matching (offset based) (step 909) is performed based on offset DBs (step 910). For each rule in match result, other conditions in the rule are verified in step 911, such as port, length, etc., based on IPS signature DB (step 912). Upon a rule match in step 913 the IPS result is saved to flow in step 915. If the rule does not match, the match result is checked on last rule in step 914. If match result indicates last rule, the IPS ctx is saved to flow (step 916), otherwise instruction 911, i.e. verifying other conditions in the rule, is repeated. After IPS ctx is saved, other service process is performed in step 918, e.g. NAT (network address translation), security, charging, packet forwarding etc. until the packet processing is finished in step 919.

The Multi-pattern regex matching (offset based) of step 909 based on the indexed data fields may be performed as will be described with respect to FIG. 11 and according to the source code of the search stage described earlier.

Figure 10:
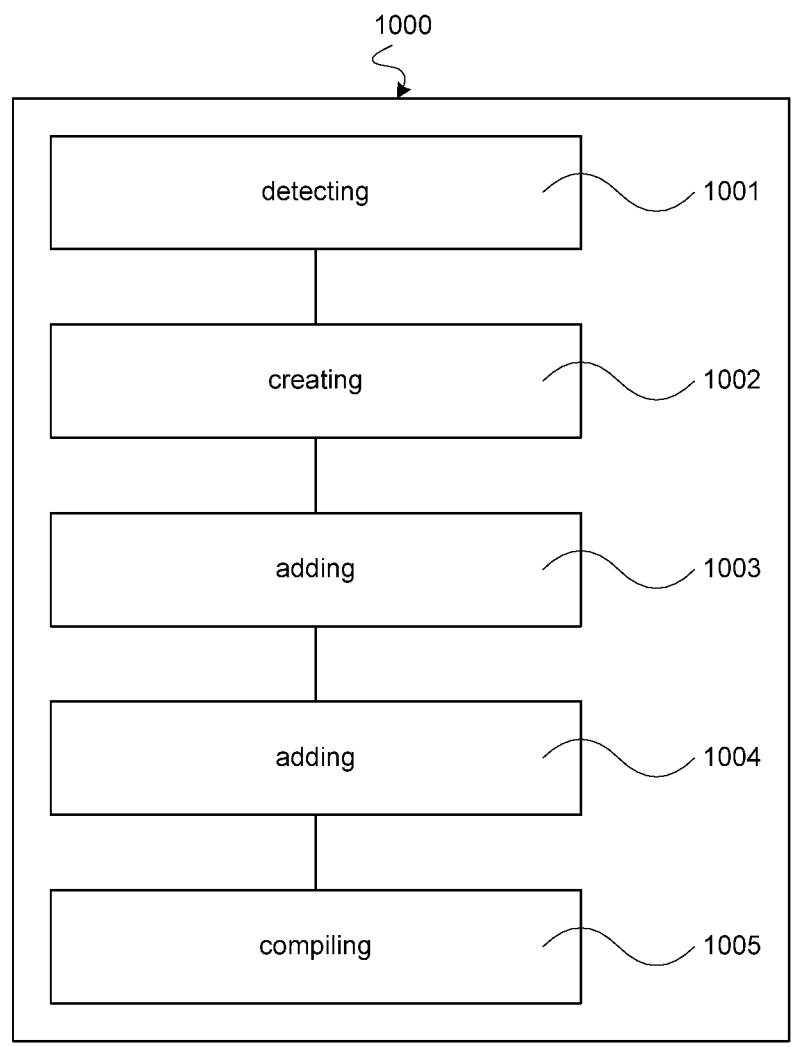
FIG. 10 shows a schematic diagram illustrating a method for generating a plurality of indexed data fields according to an implementation form.

FIG. 10 shows a schematic diagram illustrating a method 1000 for generating a plurality of indexed data fields 203, 204 based on a pattern set comprising a plurality of patterns. The method 1000 is illustrated above with respect to FIG. 1, FIG. 2, FIG. 3, FIG. 4, FIG. 5, FIG. 6, FIG. 7, FIG. 8 and FIG. 9. The method may include detecting 1001 for each pattern from the pattern set a pattern offset; creating 1002 for each pattern offset in the pattern set an indexed pattern group, e.g. an indexed pattern group 101-0, 101-5 as described above with respect to FIG. 2, wherein the index of the indexed pattern group corresponds to the pattern offset; adding 1003 each pattern in the pattern set having the same pattern offset to the indexed pattern group having an index corresponding to the pattern offset; adding 1004 each pattern having no specific pattern offset to each of the indexed pattern groups; and compiling 1005 each indexed pattern group into an indexed data field.

In one example, the patterns from the pattern set comprise REGEX regular expressions, e.g. according to IEEE POSIX 1003.2 specification. In one example, at least one of the patterns in the pattern set may be of the following type: simple string, anchor, character set, case sensitive and case insensitive. In one example, the anchor type indicates a specific pattern offset. In one example, each data field is based on a Trie. In one example, a Trie corresponding to a particular data field of the data structure comprises nodes which elements correspond to characters included in the patterns mapped to the particular data field, each node comprising at least one character. In one example, the method 1000 may include compacting nodes of the Trie having only a predetermined number of next node pointers into one compact node. In one example, the method 1000 may include compacting a plurality of nodes of the Trie into one compact node comprising a node type, wherein the node type indicates a number of next node pointers of the nodes compacted to the compact node. In one example, the method 1000 may include compacting uniquely following nodes in at least one of a middle section and a tail section of the Trie to one compact node. In one example, the compact node uses text matching with respect to elements of the nodes being compacted. In one example, the method 1000 may include merging nodes of a first layer of the Trie with nodes of a second layer of the Trie into one two-byte head node.

FIG. 11 shows a schematic diagram illustrating a method 1100 for finding patterns in a data packet, wherein the patterns to be found have a specific offset and are compiled into an indexed data field, the index of the data fields corresponds to the specific offset of the patterns. The method 1100 may include matching 1101 elements of the patterns in the indexed data field onto elements of the data packet, wherein a first element of the data packet to be matched is indicated by the index of the indexed data field; and reporting 1102 a match if a pattern in the data packet matches a pattern in the indexed data field.

The method 1100 may be used in Deep Packet Inspection, Intrusion Prevention System, AV security suite, Data Loss Prevention and URL Filtering.

Figure 12:
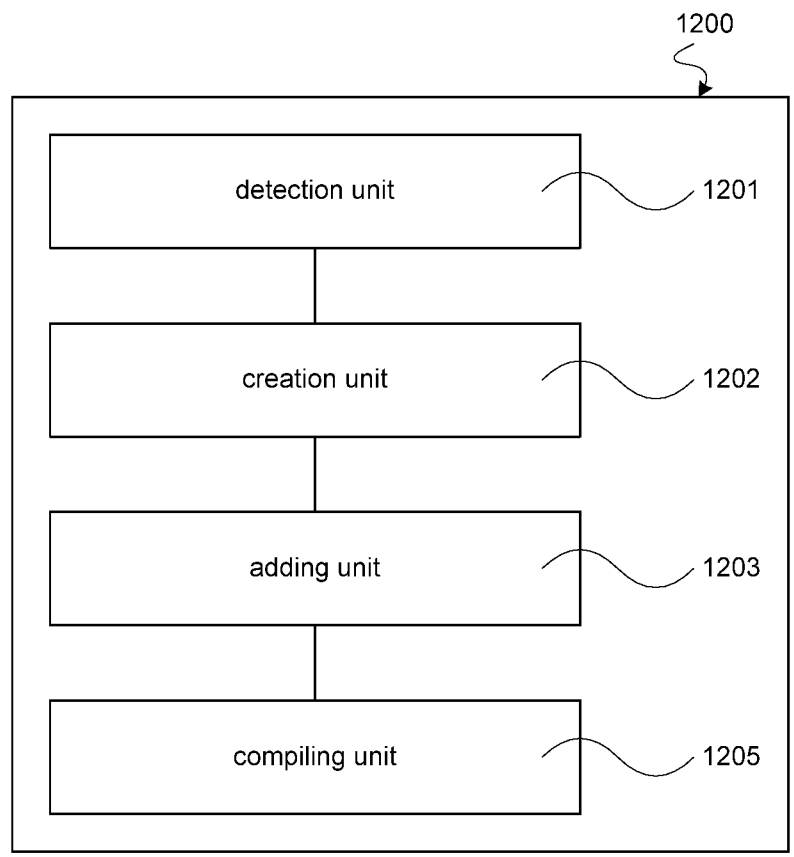
FIG. 12 shows a block diagram illustrating an apparatus for generating a plurality of indexed data fields according to an implementation form.

FIG. 12 shows a block diagram illustrating an apparatus 1200 for generating a plurality of indexed data fields 203, 204 based on a pattern set comprising a plurality of patterns. The apparatus 1200 may include a detection unit 1201 configured to detect for each pattern from the pattern set a pattern offset. The apparatus 1200 may include a creation unit 1202 configured to create for each pattern offset in the pattern set an indexed pattern group, wherein the index of the indexed pattern group corresponds to the pattern offset. The apparatus 1200 may include an adding unit 1203 configured to add each pattern in the pattern set having the same pattern offset to the indexed pattern group having an index corresponding to the pattern offset. Furthermore, the adding unit 1203 is configured to add each pattern having no specific pattern offset to each of the indexed pattern groups. The apparatus 1200 may include a compiling unit 1205 configured to compile each indexed pattern group into an indexed data field.

The apparatus 1200 may perform the method 1000 as described above with respect to FIG. 10 and illustrated with respect to FIG. 1, FIG. 2, FIG. 3, FIG. 4, FIG. 5, FIG. 6, FIG. 7, FIG. 8 and FIG. 9.

The methods, systems and devices described herein may be implemented on multi-core processors and in many-core processors. The methods, systems and devices described herein may be implemented as software in a Digital Signal Processor (DSP), in a micro-controller or in any other side-processor or as hardware circuit within an application specific integrated circuit (ASIC).

The disclosure can be implemented in digital electronic circuitry, or in computer hardware, firmware, software, or in combinations thereof, e.g. in available hardware of conventional mobile devices or in new hardware dedicated for processing the methods described herein.

The present disclosure also supports a computer program product including computer executable code or computer executable instructions that, when executed, causes at least one computer to execute the performing and computing steps described herein, in particular the methods 1100, 1200 as described above with respect to FIG. 11 and FIG. 12 and the techniques described above with respect to FIG. 1 through FIG. 13. Such a computer program product may include a readable storage medium storing program code thereon for use by a computer.

The method and algorithm as described in this disclosure may support all regex expressions illustrated in Table 1.

Aspects of the disclosure as presented above describe a method for mapping a pattern set to a data structure which may be based on a Trie. Other aspects of the disclosure relate to multi-pattern string matching algorithms that may be based on AC, MWM, etc.

While a particular feature or aspect of the disclosure may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the disclosure beyond those described herein. While the present disclosure has been described with reference to one or more particular embodiments, those skilled in the art recognize that many changes may be made thereto without departing from the scope of the present disclosure. It is therefore to be understood that within the scope of the appended claims and their equivalents, the disclosure may be practiced otherwise than as described herein.

What is claimed is:

1. A method for inspecting a data packet transmitted over a computer network, the method comprising:
   generating a plurality of indexed data fields based on a pattern set comprising a plurality of patterns by:
      detecting for each pattern from the pattern set a pattern offset;
      creating for each pattern offset in the pattern set an indexed pattern group, the index of the indexed pattern group corresponding to the pattern offset;
      adding each pattern in the pattern set having the same pattern offset to the indexed pattern group having an index corresponding to the pattern offset;
      adding each pattern having no specific pattern offset to each of the indexed pattern groups; and
      compiling each indexed pattern group into an indexed data field;
   receiving the data packet transmitted over the computer network; and
   inspecting the data packet transmitted over the computer network by performing a matching process with the data packet and the plurality of indexed data fields to generate a matching result.

2. The method of claim 1, wherein the patterns from the pattern set comprise regular expressions (REGEX).

3. The method of claim 1, wherein at least one of the patterns in the pattern set is from one of the following types: simple string type, anchor type, character set type, case sensitive type, or case insensitive type.

4. The method of claim 3, wherein the anchor type indicates a specific pattern offset.

5. The method of claim 1, wherein each indexed data field is based on a Trie.

6. The method of claim 5, wherein the Trie which a particular indexed data field is based on comprises nodes which elements correspond to characters included in the patterns which are compiled into the particular indexed data field, and each node comprising at least one character.

7. The method of claim 6, further comprising compacting nodes of a Trie having only a predetermined number of next node pointers into one compact node.

8. The method of claim 7, further comprising compacting a plurality of nodes of the Trie into the one compact node comprising a node type, the node type indicating a number of next node pointers of the nodes compacted to the compact node.

9. The method of claim 6, further comprising compacting uniquely following nodes in at least one of a middle section or a tail section of the Trie to one compact node.

10. The method of claim 5, further comprising merging nodes of a first layer of the Trie with nodes of a second layer of the Trie into one two-byte head node of the Trie.

11. The method of claim 1, further comprising compiling each pattern having no specific pattern offset further into a data field having no specific index.

12. A method for inspecting a data packet transmitted over a computer network, the method comprising:
   finding patterns in the data packet, the patterns to be found having a specific offset and being compiled into an indexed data field, the index of the data fields corresponding to the specific offset of the patterns, and the patterns being found in the data packet by:
      matching elements of the patterns in the indexed data field onto elements of the data packet, a first element of the data packet to be matched being indicated by the index of the indexed data field; and
      reporting a match when a pattern in the data packet matches a pattern in the indexed data field; and
   receiving the data packet transmitted over the computer network; and
   inspecting the data packet transmitted over the computer network by performing a matching process with the data packet and the indexed data field to generate a matching result.

13. The method of claim 12, wherein the method is used for performing a Deep Packet Inspection, an Intrusion Prevention, Data Loss Prevention, Uniform Resource Locator (URL) filtering, or antivirus search.

14. An apparatus for inspecting a data packet transmitted over a computer network, the apparatus comprising:
   a processor; and
   a memory storing computer instructions executable by the processor, the processor being configured to execute the instructions and causing the apparatus to:
      generate a plurality of indexed data fields based on a pattern set comprising a plurality of patterns by:
         detecting for each pattern from the pattern set a pattern offset;
         creating for each pattern offset in the pattern set an indexed pattern group, the index of the indexed pattern group corresponding to the pattern offset;
         adding each pattern in the pattern set having the same pattern offset to the indexed pattern group having an index corresponding to the pattern offset;
         adding each pattern having no specific pattern offset to each of the indexed pattern groups; and
         compiling each indexed pattern group into an indexed data field;
      receive the data packet transmitted over the computer network; and
      inspect the data packet transmitted over the computer network by performing a matching process with the data packet and the plurality of indexed data fields to generate a matching result.

15. The apparatus of claim 14, wherein each indexed data field is based on a Trie.

16. The apparatus of claim 15, wherein the Trie which a particular indexed data field is based on comprises nodes which elements correspond to characters included in the patterns which are compiled into the particular indexed data field, and each node comprising at least one character.

17. The apparatus of claim 16, wherein the processor is further configured to execute the instructions and cause the apparatus to compact nodes of a Trie having only a predetermined number of next node pointers into one compact node.

18. The apparatus of claim 17, wherein the processor is further configured to execute the instructions and cause the apparatus to compact a plurality of nodes of the Trie into the one compact node comprising a node type, the node type indicating a number of next node pointers of the nodes compacted to the compact node.

19. The apparatus of claim 16, wherein the processor is further configured to execute the instructions and cause the apparatus to compact uniquely following nodes in at least one of a middle section or a tail section of the Trie to one compact node.

20. The method of claim 1, wherein inspecting the data packet comprises inspecting the data packet with a Deep Packet Inspection process, and after inspecting the data packet with the Deep Packet Inspection process, the method further comprising performing a Network Address Translation function, a security function, a charging function, or a packet forwarding function.

* * * * *